W. G. BETZ.
PNEUMATIC FOR AUTOMATIC PIANOS.
APPLICATION FILED FEB. 18, 1910.
1,001,923.
Patented Aug. 29, 1911.
2 SHEETS—SHEET 1.
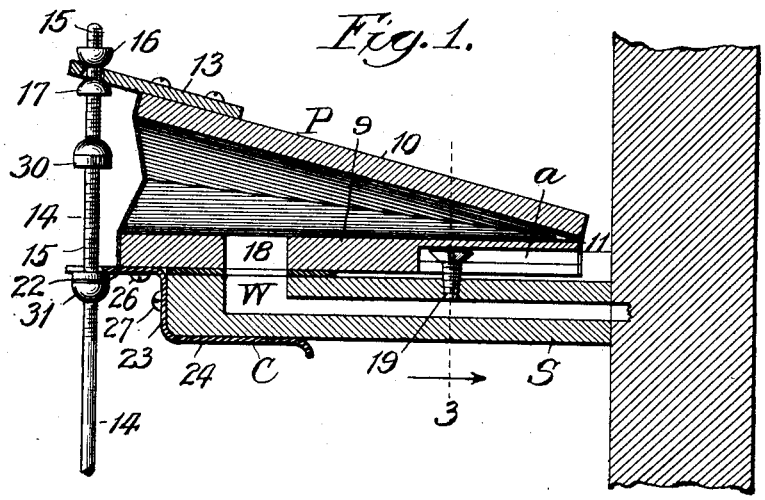
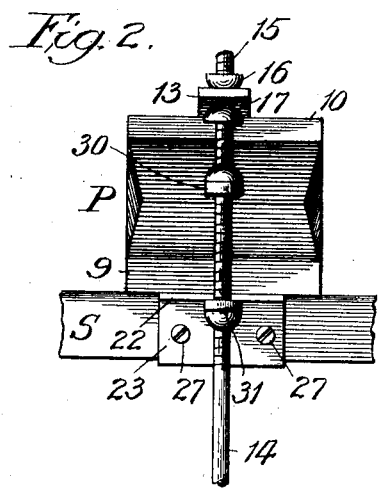
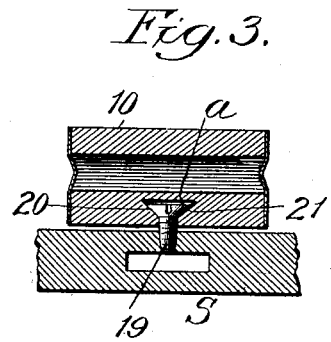
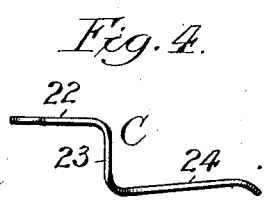
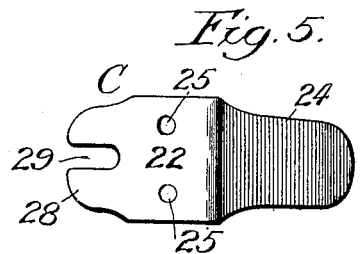
Witnesses:
John Enders
G. F. Chase.
Inventor:
William G. Betz
By Robert Catherwood
Atty.

W. G. BETZ.
PNEUMATIC FOR AUTOMATIC PIANOS.
APPLICATION FILED FEB. 18, 1910.
1,001,923.
Patented Aug. 29, 1911.
2 SHEETS—SHEET 2.
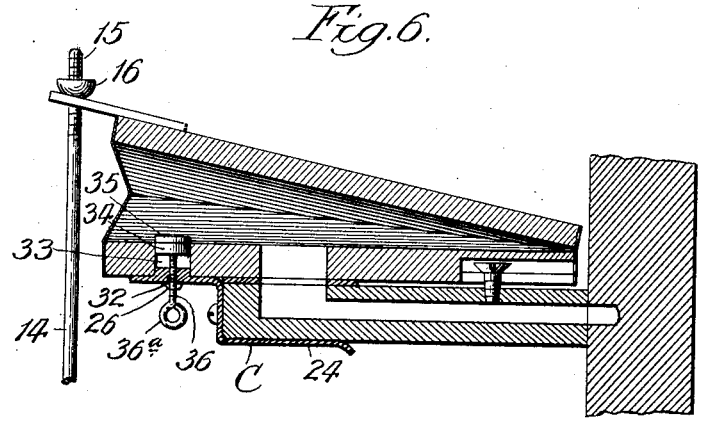
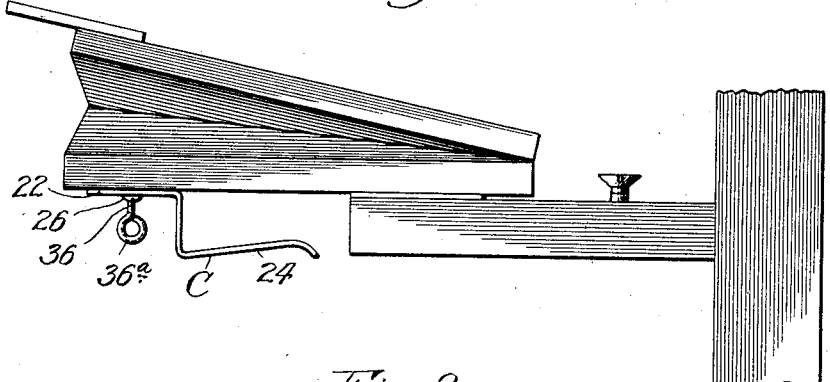
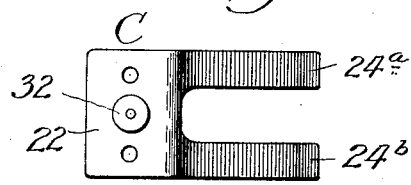
Witnesses:
John Enders
G. F. Chase.
Inventor:
William G. Betz
By Robert Catherwood
Atty.

UNITED STATES PATENT OFFICE.

WILLIAM G. BETZ, OF STEGER, ILLINOIS, ASSIGNOR TO STEGER AND SONS PIANO MANUFACTURING COMPANY, OF CHICAGO, ILLINOIS, A CORPORATION OF ILLINOIS.

PNEUMATIC FOR AUTOMATIC PIANOS.

1,001,923.   Specification of Letters Patent.   Patented Aug. 29, 1911.

Application filed February 18, 1910. Serial No. 544,621.

*To all whom it may concern:*

Be it known that I, WILLIAM G. BETZ, a citizen of the United States, residing at the town of Steger, in the county of Cook and State of Illinois, have invented certain new and useful Improvements in Pneumatics for Automatic Pianos, of which the following is a specification, reference being had therein to the accompanying drawings.

My invention relates to pneumatics for automatic pianos. Its object is to provide a device of this character having simple and economical means for adjusting the stroke of the movable member and capacity for ready attachment to and detachment from pneumatically controlled pianos in proper position for communication with the windways without injury or destruction of any of the parts.

In the accompanying drawings, I have shown a device embodying my invention in one of its preferred forms, and I have also illustrated a modification.

Figure 1 is a longitudinal cross section of a pneumatic, portions of a windway and of an upright support, showing also a push rod and connections in elevation; Fig. 2 is a front elevation of the pneumatic and its attached parts; Fig. 3 is a cross section taken on line 3 of Fig. 1; Fig. 4 is a side view of the spring clamp plate; Fig. 5 is a top view of the spring clamp plate; Fig. 6 is a view similar to Fig. 1, illustrating a modification of my invention; Fig. 7 is a side view of the modified construction, illustrating the manner of attaching and detaching the pneumatic; Fig. 8 is a top plan view of a modification of the spring clamp plate.

In the drawings, P indicates a pneumatic, comprising a stationary member 9 and a movable member 10 hinged at 11 and operating a lever arm or extension 13 in the usual manner. The forward end of the lever arm 13 is secured to push rod 14 by means of the threaded surfaces 15 thereon and the interiorly threaded nuts 16 and 17. This connection is adapted, on collapse and expansion of the pneumatic P, to operate the push rod 14 longitudinally.

In attaching the pneumatic, I first provide intermembering male and female members, one on the rear of the pneumatic and the other upon a shelf or stationary support S, through which passes a windway W in communication with the exhaust or suction mechanism of the piano. The opening 18 in stationary member 9 when brought in registration with the end of windway W establishes communication with the pneumatic P so that modification of the tension in the windway W and pneumatic P, through the operation of the well known controllers of the exhaust or suction mechanism (not shown), alternately collapses and expands the pneumatic. I prefer to accomplish the intermembering, by providing a screw 19 on support S and a bevel groove *a* in the lower rear surface of the pneumatic P. The oppositely inclined sides 20, 21 of the groove *a* are adapted closely to embrace the under sides of the head of the screw 19. The length of groove *a* is sufficient to allow the pneumatic to be slipped back rearward until the opening 18 is brought in registration with the opening in windway W, the intermembering device above described, holding the rear of the pneumatic tightly against the support.

To provide against any leakage or communication of the interior of the pneumatic with outside air, the pneumatic must be held tightly against the upper surface of support S. To this end I provide a spring clamp C, preferably bent as shown in Fig. 4 and comprising the horizontal screw-base 22, the vertical screw-base 23 and the elastically tempered spring portion or prong 24. The length of the base 23 is determined by the thickness of the support. Both bases 22 and 23 are preferably provided with screw holes and the spring clamp secured to the pneumatic by screws 26 to the support by screws 27, the elasticity of the prong 24 tending to maintain a tight joint between windway W and opening 18. The forward end of base 22 is prolonged to form a forked arm 28, the opening 29 between the forks being sufficient to allow push rod 14 to move longitudinally freely therein, the forks projecting on opposite sides of rod 14.

The stroke of the pneumatic may be adjustably limited by means of interiorly threaded buttons 30 and 31 on the threaded surfaces 15 of push rod 14. By turning these buttons to bring them nearer together, the stroke of the pneumatic is shortened and by screwing them to draw apart the stroke is lengthened. This means of adjusting the stroke of the pneumatic determines the longitudinal stroke of the push rod 14.

A simple modification of my preferred form of means for adjusting the stroke of the pneumatic is illustrated in Figs. 6 and 7. In this construction the forked arm 28, the buttons 30, 31 and 17 are dispensed with and adjustment obtained by cutting a threaded opening 32 in base 22, and an opening 33 through member 9 and providing a disk 34, adapted to move vertically in the opening 33, having an upwardly extended contact surface 35, a downwardly extended shank 36 threaded to engage the threads of opening 32 and a handle 36ª projecting below opening 32, both the contact surface and the shank being screwed to the disk 34. By turning the shank to bring contact surface 35 into the path of movable member 10 any desired distance, the stroke imparted by pneumatic P may be shortened or lengthened at will and a nice adjustment thereof obtained. In Fig. 8, two prongs 24ª and 24ᵇ are shown in lieu of a single prong 24.

I am aware that many modifications of my invention will occur to those skilled in the art and I do not wish to be understood as limiting myself to the preferred forms shown and described, but

What I claim is:—

1. In a pneumatic for automatic pianos, a combination clamp and stop secured to the stationary member of the pneumatic provided with a prong adapted to slip over the end of a support and removably secure said pneumatic thereto, a push rod secured to the movable member of the pneumatic, an adjustable stop thereon adapted to contact with said combination clamp and stop to limit the movement of said push rod, substantially as described.

2. A pneumatic for automatic pianos, provided with a clamp-stop secured to the stationary member of the pneumatic having a forward projection and a rearward elastic prong, the lower side of said stationary member and the upper side of said prong being adapted to engage a support for said pneumatic, a push rod and adjustable stops arranged to contact with said forward projection to limit the stroke of said rod, substantially as described.

In testimony whereof I hereunto affix my signature in the presence of two witnesses.

WILLIAM G. BETZ.

Witnesses:
 EMIL SWANSON,
 JOHN SVANSON.